United States Patent
Qian (10) Patent No.: US 10,382,607 B2
(45) Date of Patent: Aug. 13, 2019

(54) SWITCHING TV CHANNELS USING A MOBILE DEVICE AND A SET-TOP BOX

(71) Applicant: Alibaba Group Holding Limited, Grand Cayman (KY)

(72) Inventor: Yunzhong Qian, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 214 days.

(21) Appl. No.: 14/693,693

(22) Filed: Apr. 22, 2015

(65) Prior Publication Data

US 2015/0312512 A1   Oct. 29, 2015

(30) Foreign Application Priority Data

Apr. 28, 2014   (CN) .......................... 2014 1 0174580

(51) Int. Cl.
*H04M 1/725*   (2006.01)
*H04W 76/14*   (2018.01)
(Continued)

(52) U.S. Cl.
CPC ..... *H04M 1/7253* (2013.01); *H04M 1/72533* (2013.01); *H04N 5/4403* (2013.01);
(Continued)

(58) Field of Classification Search
CPC ........... H04M 1/7253; H04M 1/72533; H04M 2250/02; H04N 2005/4407;
(Continued)

(56) References Cited

U.S. PATENT DOCUMENTS

| | | | | |
|---|---|---|---|---|
| 5,751,282 A | * | 5/1998 | Girard | H04N 5/44543 348/E5.105 |
| 6,862,741 B1 | * | 3/2005 | Grooters | H04N 5/44543 348/734 |

(Continued)

FOREIGN PATENT DOCUMENTS

| CN | 101399992 A | 4/2009 |
|---|---|---|
| CN | 102685575 A | 9/2012 |

(Continued)

OTHER PUBLICATIONS

The PCT Search Report and Written Opinion dated Jul. 23, 2015 for PCT application No. PCT/US2015/027126, 12 pages.

(Continued)

*Primary Examiner* — Benjamin R Bruckart
*Assistant Examiner* — Jen-Shi Huang
(74) *Attorney, Agent, or Firm* — Lee & Hayes, P.C.

(57) ABSTRACT

A method and system for switching television channels. A mobile terminal receives channel information, and displays the channel information on a display screen, to allow a user operating the mobile terminal to submit an instruction for switching to a user desired channel. The mobile terminal transmits the user instruction to a set-top box to instruct the set-top box to switch to the user desired channel according to the user instruction. A registration code generated using IMEI or MEID of the mobile device is registered at the set-top box to verify the mobile device before receiving or executing the user instruction. The transmission or the execution of the user instruction may be delayed to a scheduled time without affecting the currently played program.

18 Claims, 6 Drawing Sheets

(51) Int. Cl.
*H04N 21/41* (2011.01)
*H04N 21/422* (2011.01)
*H04N 21/482* (2011.01)
*H04N 5/44* (2011.01)
*H04N 5/50* (2006.01)

(52) U.S. Cl.
CPC ..... *H04N 21/4108* (2013.01); *H04N 21/4126* (2013.01); *H04N 21/4222* (2013.01); *H04N 21/42207* (2013.01); *H04N 21/42209* (2013.01); *H04N 21/482* (2013.01); *H04W 76/14* (2018.02); *H04M 2250/02* (2013.01); *H04N 5/50* (2013.01); *H04N 2005/441* (2013.01); *H04N 2005/4407* (2013.01)

(58) Field of Classification Search
CPC ......... H04N 2005/441; H04N 21/4108; H04N 21/4126; H04N 21/42207; H04N 21/42209; H04N 21/4222; H04N 21/482; H04N 5/4403; H04N 5/50; H04N 2005/4425; H04N 2005/4432; H04N 5/44543; H04W 60/00
See application file for complete search history.

(56) References Cited

U.S. PATENT DOCUMENTS

| | | | |
|---|---|---|---|
| 7,725,102 | B2 | 5/2010 | Engstrom et al. |
| 8,442,527 | B1 * | 5/2013 | Machiraju ............... H04W 4/00 380/270 |
| 8,908,106 | B2 | 12/2014 | Mori |
| 8,955,001 | B2 | 2/2015 | Bhatia et al. |
| 2003/0149978 | A1 * | 8/2003 | Plotnick ............... G06Q 10/109 725/39 |
| 2003/0154484 | A1 * | 8/2003 | Plourde, Jr. ........ H04N 5/44543 725/58 |
| 2006/0247851 | A1 | 11/2006 | Morris |
| 2007/0089158 | A1 | 4/2007 | Clark |
| 2008/0166105 | A1 | 7/2008 | Vanderhoff |
| 2008/0168520 | A1 * | 7/2008 | Vanderhoff .......... H04N 17/004 725/131 |
| 2009/0265446 | A1 * | 10/2009 | Hayashi ............. H04N 7/17318 709/219 |
| 2010/0071007 | A1 * | 3/2010 | Meijer ................... H04N 5/782 725/58 |
| 2010/0333135 | A1 | 12/2010 | Lau et al. |
| 2011/0117850 | A1 | 5/2011 | Fung et al. |
| 2011/0167447 | A1 | 7/2011 | Wong |
| 2011/0289419 | A1 | 11/2011 | Yu et al. |
| 2011/0296465 | A1 | 12/2011 | Krishnan et al. |
| 2012/0114121 | A1 * | 5/2012 | Jung ................. H04N 21/26613 380/242 |
| 2012/0117590 | A1 | 5/2012 | Agnihotri et al. |
| 2013/0171981 | A1 | 7/2013 | Woo |
| 2013/0250182 | A1 | 9/2013 | Yuan et al. |
| 2014/0152899 | A1 * | 6/2014 | Newell ..................... H04N 5/44 348/734 |
| 2014/0154983 | A1 | 6/2014 | Schultz et al. |
| 2014/0259061 | A1 | 9/2014 | Delpuch |

FOREIGN PATENT DOCUMENTS

| | | |
|---|---|---|
| CN | 103108222 A | 5/2013 |
| WO | WO2011059258 A3 | 5/2011 |

OTHER PUBLICATIONS

The Chinese Search Report for CN Application No. 2014101745806 dated Aug. 24, 2017, 2 pages.

* cited by examiner

SWITCHING TV CHANNELS USING A MOBILE DEVICE AND A SET-TOP BOX

RELATED PATENT APPLICATIONS

This application claims foreign priority to Chinese Patent Application No. 201410174580.6 filed on Apr. 28, 2014, entitled "SWITCHING TV CHANNELS USING A MOBILE DEVICE AND A SET-TOP BOX", which is hereby incorporated by reference in its entirety.

TECHNICAL FIELD

This application relates to the field of electronic communications, particularly to techniques of switching TV channels on a set-top box.

BACKGROUND

With the development of electronic communication technologies, smart television and digital television have become popular household items. More and more television channels are available. With a set-top box, for example, up to 100 or more television channels are often available for user selection. When a user wants to watch a TV channel, the current method requires the user to use a remote control of a set-top box to switch from one channel to the next one, until the wanted channel is found. Alternatively, the user may enter a specific channel number on a set-top box remote control to switch to a wanted channel.

Each of the existing methods have its own limitations. With the first method, it may take a long time to find the right channel; with the second method, it requires the user to remember the channel numbers of TV channels, making it inconvenient to use.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

An aspect of this disclosure is a method for switching television channels. According to the method, a mobile terminal receives channel information, and displays the channel information on a display screen to allow the user of the mobile terminal to submit a user instruction for switching to a user desired channel. The mobile terminal transmits the user instruction to a set-top box to instruct the set-top box to switch to the channel according to the user instruction.

The mobile terminal may send a registration code to the set-top box to let the set-top box verify the mobile terminal before sending the channel information to the mobile terminal. The registration code of the mobile terminal may be sent along with a request for the channel information. The registration code of the mobile terminal is transmitted to the set-top box using a wireless communications means built-in the mobile terminal, such as a Bluetooth device, an infrared device, or Wi-Fi.

In an embodiment, an equipment identifier, such as an IMEI (International Mobile Station Equipment Identity) of the mobile terminal is obtained to generate the registration code of the mobile terminal.

In another embodiment, a transmitting time of the user instruction is obtained by the mobile device, such that the user instruction is transmitted from the mobile terminal to a set-top box at the transmitting time instead of immediately. The transmitting time may be included in the user instruction.

According to another aspect of a method for switching television channels, a set-top box sends channel information to a mobile terminal to allow the channel information to be displayed on a display screen of the mobile terminal. The set-top box receives from the mobile terminal a user instruction for switching to a user desired channel, and switches to the user desired channel by executing the user instruction at the set-top box.

The set-top box may receive a registration code of the mobile terminal to verify the mobile terminal before sending the requested channel information. The registration code may be generated using an equipment identifier such as an IMEI of the mobile terminal.

In an embodiment, the set-top box receives an execution time of the user instruction, and switches the user desired channel according to the user instruction at the execution time. The execution time may be included in the user instruction sent to the set-top box.

Another aspect of the disclosure is a mobile device for switching television channels, wherein the mobile device has a processor, computer-readable memory and storage medium, and I/O devices, and is programmed to receive channel information, display the channel information on a display screen of the mobile terminal, receive a user instruction for switching to a user desired channel, and transmit the user instruction to a set-top box to allow the set-top box to switch to the channel. The mobile terminal may generate and send a registration code of the mobile terminal to the set-top box in order to for the set-top box to verify the mobile terminal before sending the channel information to the mobile terminal. In an embodiment, the user instruction is programmed to be transmitted to a set-top box at a scheduled transmitting time instead of immediately.

Yet another aspect of the disclosure is a set-top box for switching television channels. The set-top box has a processor, computer-readable memory and storage medium, and I/O devices, and is programmed to send channel information to a mobile terminal to allow the channel information to be displayed on a display screen of the mobile terminal. The set-top box is further programmed to receive from the mobile terminal a user instruction for switching to a user desired channel, and switch to the user desired channel by executing the user instruction. The set-top box may be further programmed to receive and register a registration code of the mobile terminal, and verify the registration code of the mobile terminal before sending the requested channel information.

In an embodiment, the set-top box is programmed to switch to the user desired channel according to the user instruction at a scheduled execution time of the user instruction instead of immediately upon receiving the user instruction.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

BRIEF DESCRIPTION OF THE FIGURES

The detailed description is described with reference to the accompanying figures.

DETAILED DESCRIPTION

The present disclosure is described in further detail in conjunction with accompanying figures and example embodiments. In the description, the term "technique(s)," for instance, may refer to a method, an apparatus device, a system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

In a typical configuration, a computing device includes one or more processors (CPU), input/output interfaces, network interfaces, and memory. The memory may include a computer-readable medium such as a volatile memory, random access memory (RAM) and/or other forms of non-volatile memory, such as read only memory (ROM) or flash memory (flash RAM). The internal memory of a computing device is a type of computer-readable memory medium.

The computer-readable media include permanent and non-permanent, removable and non-removable media, and may be formed in any method or technology for storage of information. Information stored may be a set of computer-readable instructions, data structures, program modules or other data. Examples of the computer storage media include, but are not limited to, phase-change memory (PRAM), a static random access memory (SRAM), dynamic random access memory (DRAM), other types of random access memory (RAM), read-only memory (ROM), electrically erasable programmable read-only memory (EEPROM), flash memory or other memory technology, CD-ROM read-only memory (CD-ROM), digital versatile disc (DVD) or other optical storages, magnetic cassettes, magnetic tape disk storage or other magnetic storage devices, or any other non-transmission medium that may be used to store information accessible by a computing device. According to definitions of the present disclosure, computer-readable media do not include temporary computer readable media (transitory media), such as a modulated data signal and a carrier wave.

Exemplary Embodiments

Figure 1:
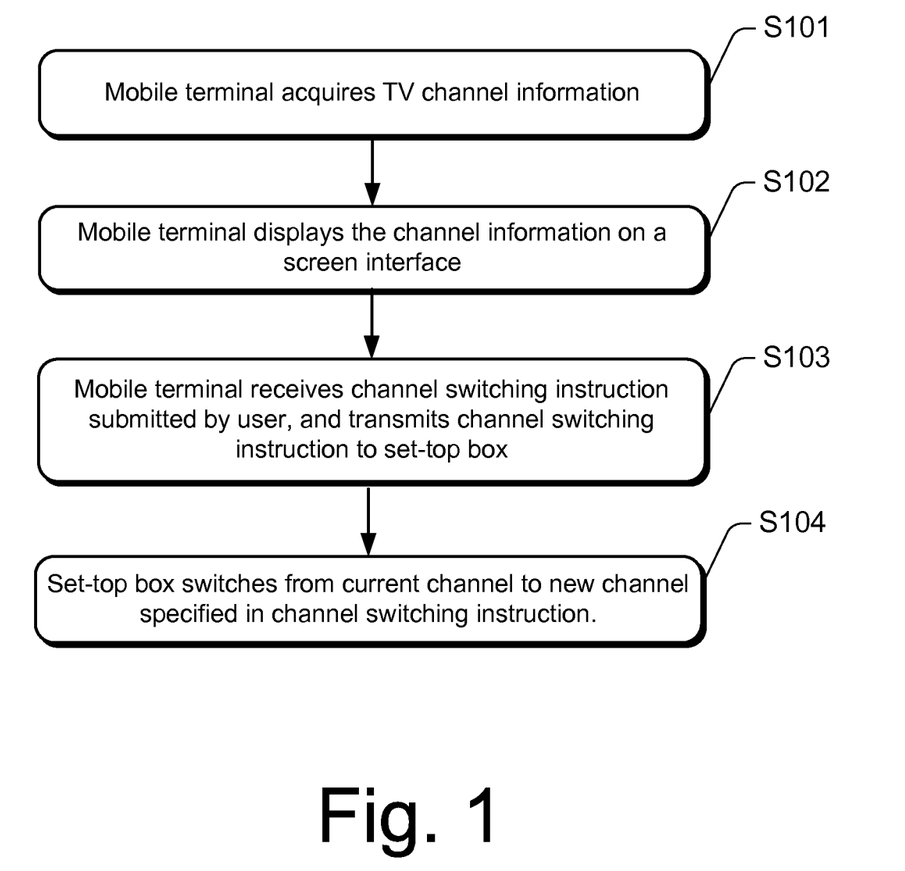
FIG. 1 is a flow chart of a first example of the disclosed method of switching TV channels.

FIG. 1 is a flow chart of a first example of the disclosed method of switching TV channels.

At block S101, a mobile terminal acquires TV channel information.

TV channel information may include multiple TV channels and TV programs for each TV channel. The programs of each channel may include a current program being played at the current time, a program to be played at a next time period, and/or a program that has been played at a previous time period (which can be used for playback).

The mobile terminal may acquire TV channel information selectively to include, based on actual needs, any one or combination of program information of a current time period, program information of a next time period, and program information of a previous time period. For the convenience of the user, it may be provided for the user to select from a menu a channel and its corresponding program information of a desired time period. The user may make the selections of channels and the associated programs so that the mobile terminal may only acquire such preselected channel information. The user may subsequently make further selection of a desired channel and is programmed at a certain time for channel switching.

At block S102, the mobile terminal displays the acquired TV channel information on a screen with a display interface.

The user may make a selection from the channel information displayed on the screen of the mobile terminal, and submit the selection as an instruction for switching channel.

Specifically, as multiple menu selections are provided for the user to browse and make selections. Each menu selection may have a corresponding user interface to display the TV programs of a certain channel at certain time periods for further selection by the user. For example, the menu may provide two selections, one for "playing" (which includes programs of the current time period, and that of the next time period), and the other for "already played" (which includes programs of a previous time period). As the user selects "playing", the mobile terminal acquires TV programs that are being played in the current time period, and programs that are to be played in the next time period, for each of the multiple channels available, and display the acquired channel information on the screen for further user selection. If the user selects "already played", the mobile terminal acquires TV programs that have been played in a previous time period for each of the multiple channels, and displays the applied channel information on the screen for further user selection.

The user may browse the displayed channel information and make a selection of a desired channel, and submit an instruction for switching the channel to the selected channel. The instruction for switching the channel may be automatically submitted as the user makes a selection of a desired channel, or submitted as the user presses a dedicated button for submitting an instruction after making the selection. It is a matter of design choice based on actual needs and preferences.

At block S103, the mobile terminal receives the user instruction for switching to a channel selected by the user, and transmits the user instruction to a set-top box.

At block 104, the set-top box executes the user instruction by switching to the channel selected by the user according to the user instruction.

In an embodiment, when receiving the user instruction, the mobile terminal also obtains a transmitting time of the user instruction. The transmitting time specifies the time when the user instruction should be transmitted from the mobile terminal to a set-top box.

In other words, a transmitting time is set for transmitting the user instruction for switching channel to the set-top box, such that the user instruction is not transmitted immediately after being submitted by the user, but is scheduled to be done at the transmitting time, which may mean a delay from the current time. In order to do this, the mobile terminal may be programmed to check if the current time has reached the scheduled transmitting time of the user instruction, and transmit the user instruction to the set-top box if affirmative, but continue to wait if not.

As a result, instead of receiving the instruction to switch the channel immediately, the set-top box receives the user instruction and switches the channel at a time properly scheduled according to the programming condition and the user needs. This allows the actual channel switching to occur at the properly scheduled time instead of immediately when the user instruction is submitted by the user. For example, if the current time is 10:00, and the broadcast time of the user preselected program is 10:40, the transmitting time of the user instruction for switching channel may be scheduled at 10:40 (or a time slightly before 10:40), so that the transmitting of the instruction (and channel switching as a result) may not occur until the time when the user-selected program is broadcast.

Alternatively, the instruction may be sent to the set-top box immediately, but the set-top box is scheduled to execute the instruction at a proper execution time. For example, if the current time is 10:00, and the broadcast time of the user preselected program is 10:40, the execution time of the user instruction for switching channel may be scheduled at 10:40 (or a time slightly before 10:40), so that the channel switching may not occur until the time when the preselected program is broadcast even if the user instruction has been transmitted earlier.

To secure the communications between the mobile terminal and the set-top box, a private registration code based on an equipment identity of the mobile terminal may be used for the set-top box to verify the mobile terminal, as shown below.

Figure 2:
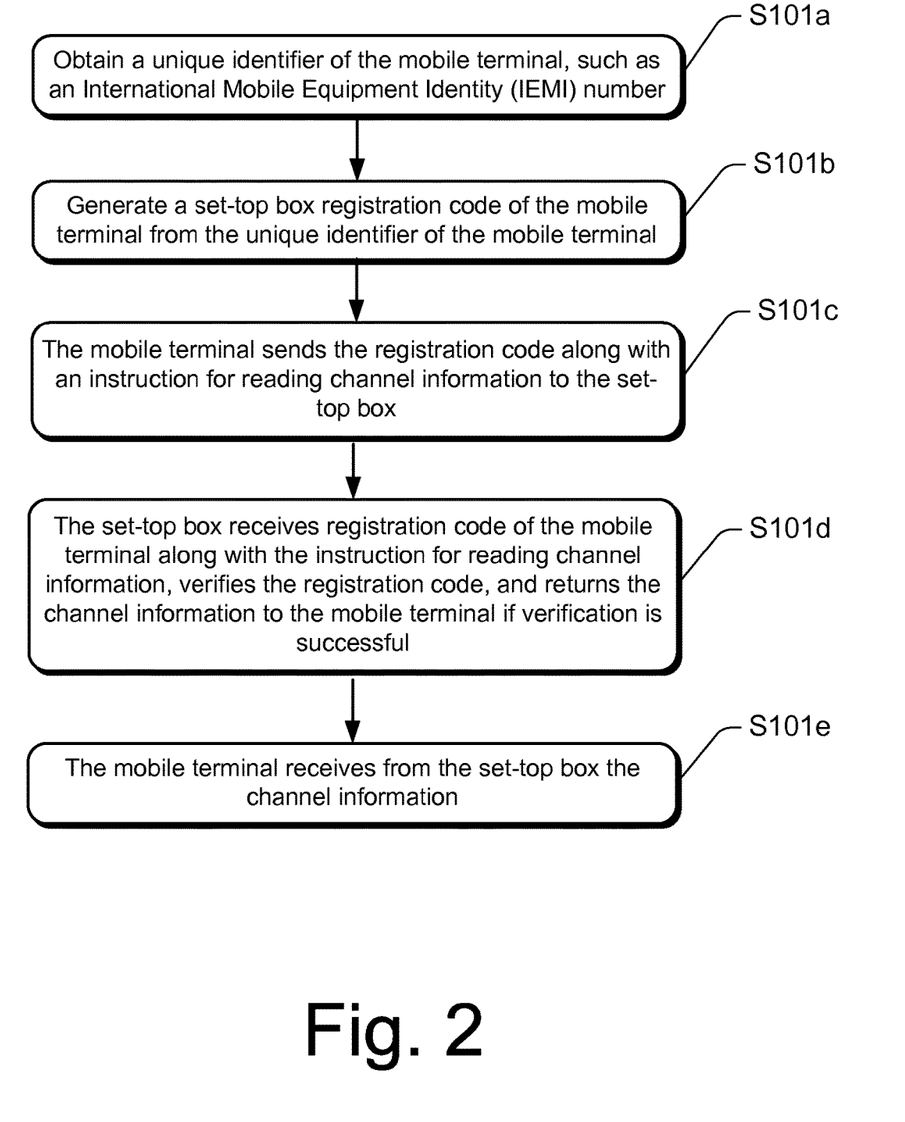
FIG. 2 is a flowchart of a second example of the disclosed method for switching TV channels.

FIG. 2 is a flowchart of a second example of the disclosed method for switching TV channels. The process of FIG. 2 is an embodiment of block S101 of FIG. 1 described in further detail.

At block S101a, a unique identifier of the mobile terminal, such as an International Mobile Equipment Identity (IEMI) number, is obtained. The mobile terminal may be a mobile device such as a mobile phone, a mobile computer, a tablet computer (e.g., iPad) which has a built-in unique identifier.

At block S101b, a set-top box registration code of the mobile terminal is generated from the unique identifier of the mobile terminal, such as IEMI, to allow the user to register the registration code of the mobile terminal with the set-top box.

The registration code may be generated by applying a computational algorithm such as a random function to the IEMI of the mobile terminal. Any suitable algorithm that may produce a unique registration code from a unique IEMI may be used. Alternatively, instead of using IEMI, MEID (Mobile Equipment Identifier) may be used for generating the registration code. If the mobile terminal is a mobile phone, the registration code may be generated from the phone number of the mobile phone. The present disclosure does not restrict the method and the algorithm used for generating the registration code of the mobile device.

The registration code may be generated on the mobile terminal, and communicated to the set-top box for registration, but may also be generated on the set-top box and communicated to the mobile terminal. Once generated, the registration code may be stored on the mobile terminal to be used for a next verification without having to regenerate it.

At block S101c, the mobile terminal sends the registration code along with an instruction for reading channel information to the set-top box. The registration code may be carried by the instruction for reading channel information as a part thereof. However, the registration code and instruction for reading channel information may also be sent separately.

The information may be sent using a communication device built-in the mobile terminal, such as Bluetooth, infrared and Wi-Fi. For example, if Wi-Fi is used, when sending the registration code carried by the instruction for reading channel information, the IP address of the set-top box may be entered on the mobile terminal to allow the mobile terminal to visit a service page of the set-top box and send the registration code along with the instructions for reading channel information to the set-top box.

At block S101d, the set-top box receives registration code of the mobile terminal along with the instruction for reading channel information, verifies the registration code, and returns the channel information to the mobile terminal if verification is successful.

In an exemplary process of verification, the set-top box searches through the registration codes registered at the set-top box to find one that matches the received registration code. If a match is found, the verification is successful, but if none is found, the verification fails. After a failed verification, notification may be sent to the mobile terminal to prompt the user to register the mobile terminal's registration code.

A user may use a mobile terminal to control the set-top box to a channel only if a registration code of the mobile terminal is registered at the set-top box, and a subsequent verification is successful. This prevents unregistered mobile terminals from accessing the set-top box, thus assures security.

At block S101e, the mobile terminal receives from the set-top box the channel information.

To ensure the reliability of the communication between the mobile terminal and the set-top box, in one embodiment a communication protocol is set up.

Figure 3:
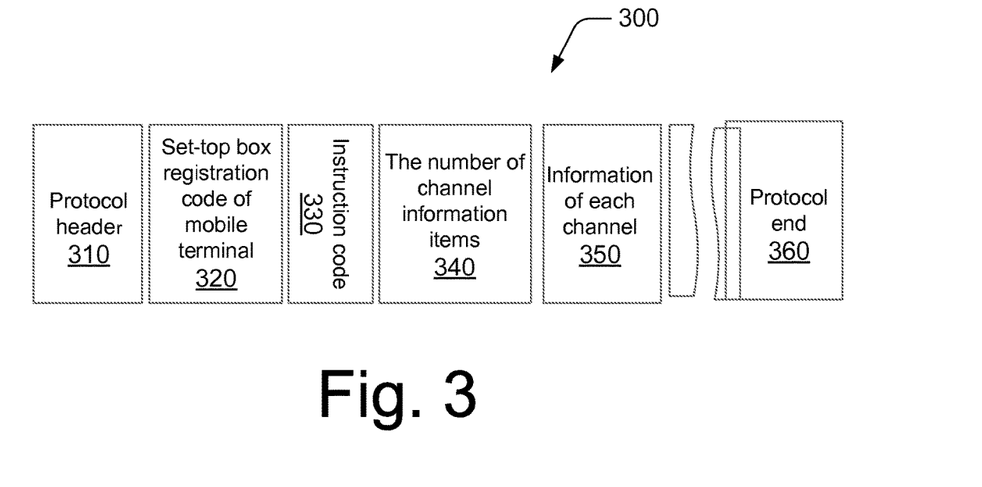
FIG. 3 is a block diagram of a data structure in a communication protocol in accordance with the disclosed method for switching TV channels.

FIG. 3 is a block diagram of a data structure in an example communication protocol in accordance with the disclosed method for switching TV channels. As shown in FIG. 3, each data frame 300 includes a protocol header 310; segment 320 containing the set-top box registration code of the mobile terminal; instruction code 330; segment 340 indicating the total number of channel information items contained in the data frame 300; segment 350 containing information of each channel information item; and a protocol end 360.

Information of each channel information item in segment 350 includes the respective channel number and the associated programs which may include programs being played in the current time period, programs to be played in the next time period, and/or programs that have been played in a previous time period, of the respective channel.

As illustrated above, using the communication means between the set-top box and the mobile terminal, the mobile terminal receives TV channel information from the set-top box, and displays the received channel information to the user on the screen of the mobile terminal. This allows the user to browse the channel information and select the desired channel to be switched to, all on the mobile terminal, which can have a much more powerful user interface then a typical set-top box, making the channel selection much easier. In addition, the user does not need to memorize the channel numbers.

As the channel browsing and selection are done on the mobile terminal, the current program that is being played on the set-top box is not interrupted or affected in any way. Furthermore, the channel switching instruction may be scheduled to be transmitted to the set-top box at a proper time, or the channel switching instruction may be executed by the set-top box at the scheduled proper time even if it is transmitted to the set-top box earlier. This further avoids interference with the current replay program. Furthermore, security is ensured by the use of the registration code of the mobile terminal prevent unregistered mobile terminals from accessing the set-top box to switch channels.

Figure 4:
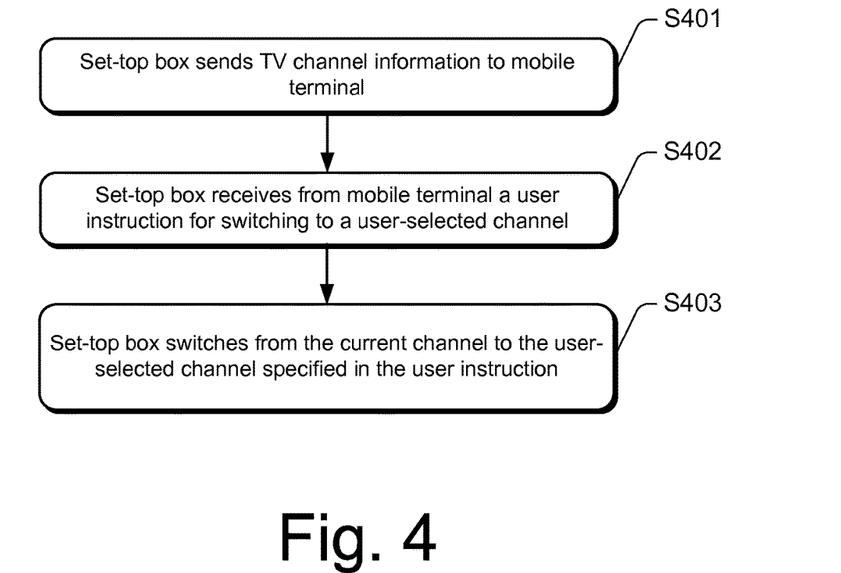
FIG. 4 is a flowchart of a third example of the disclosed method for switching TV channels.

FIG. 4 is a flowchart of a third example of the disclosed method for switching TV channels. The process in this example is similar to that in FIG. 1, but is more set-top box centric.

At block S401, the set-top box sends TV channel information to the mobile terminal. This allows the channel information to be displayed to the user on the screen of the mobile terminal, so that the user may use the user interface on the mobile terminal to select channels, and to send channel switching instructions. The TV channel information includes multiple channel numbers and TV programs corresponding to each channel.

The channel information is sent to the mobile terminal in response to receiving from the mobile terminal an instruction for reading channel information. In one embodiment, the instruction for reading channel information is received along with a set-top box registration code of the mobile terminal. The registration code may be generated using a unique identifier of the mobile terminal, such as IEMI. The set-top box verifies the registration code, and sends the channel information to the mobile terminal if the verification is successful.

At block S402, the set-top box receives from the mobile terminal a user instruction for switching to a user-selected channel.

At block S403, the set-top box switches from the current channel to the user-selected channel specified in the user instruction.

In an embodiment, the set-top box may receive a registration code of the mobile terminal, and register the received registration code at the set-top box.

In connection to the method disclosed herein, the present disclosure also provides a mobile terminal and a set-top box for implementing the switching TV channels method described herein. The mobile terminal and the set-top box may include a computing device having a processor, computer-readable memory and storage medium, and I/O devices, wherein the computing device is programmed to perform acts as described herein in connection with the example methods.

The above-described techniques may be implemented with the help of one or more non-transitory computer-readable media containing computer-executable instructions.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 5:
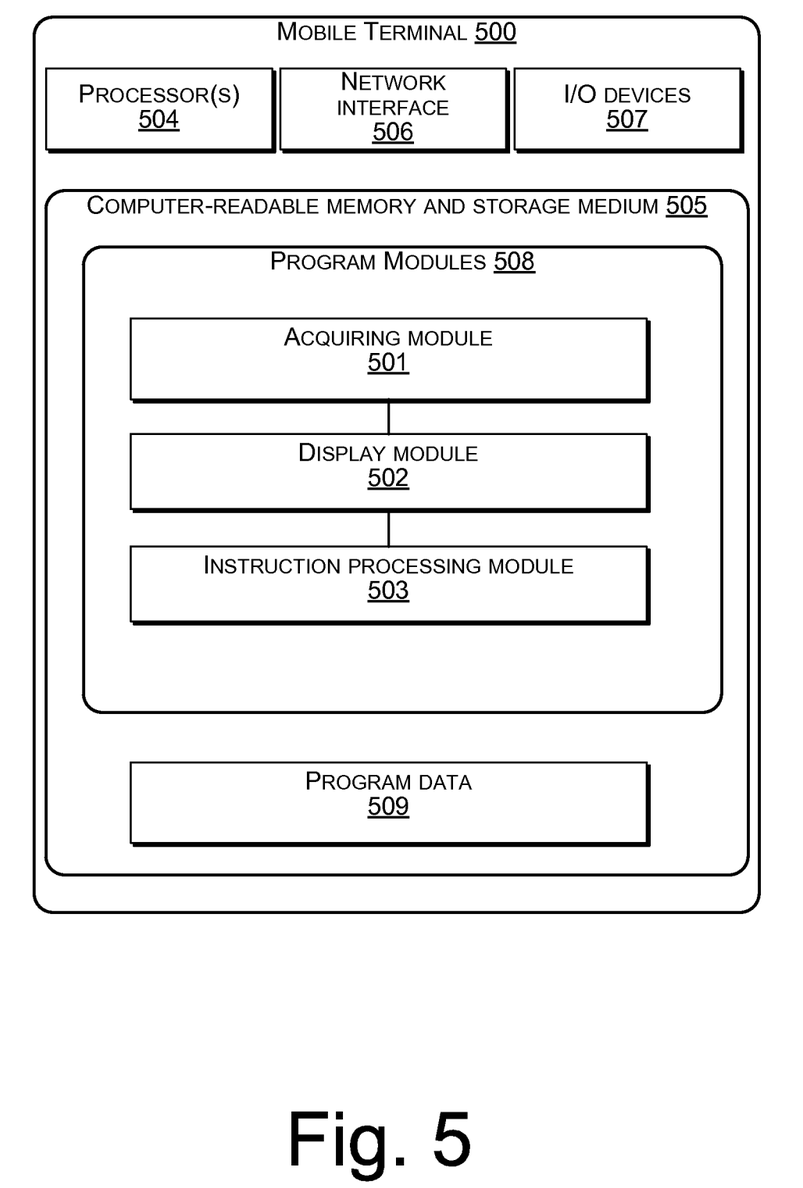
FIG. 5 is a block diagram of an example mobile terminal for implementing the disclosed method for switching TV channels.

FIG. 5 is a block diagram of an exemplary mobile terminal for implementing the disclosed method for switching TV channels. The mobile terminal 500 includes several modules as described below.

An acquiring module 501 is programmed for acquiring TV channel information.

A display module 502 is programmed for displaying the acquired channel information on a display interface of the mobile device.

An instruction processing module 503 is programmed for receiving the user instruction for switching channel, and transmit the user instruction to a set-top box to allow the set-top box to switch from the current channel to the user-selected channel specified in the user instruction.

In an embodiment, the acquiring module 501 may further include a transmitting unit and a receiving unit (not separately shown). The transmitting unit is programmed for sending a set-top box registration code of the mobile terminal 500 along with an instruction for reading channel information to the set-top box, to allow the set-top box to verify the received registration code, and return the requested channel information if the verification is successful. The receiving unit is programmed for receiving the channel information returned from the set-top box.

In some embodiments, the transmitting unit may include a wireless communication device such as Bluetooth, infrared or Wi-Fi to wirelessly transmit the registration code and the user instruction to the set-top box.

In another embodiment, the acquiring channel 501 may further include an acquiring unit for acquiring an IEMI of the mobile terminal 500, and a generating unit for generating a set-top box registration code of the mobile terminal 500 from the acquired IEMI, to allow the user to register the mobile terminal 500 with the set-top box as described herein.

In an embodiment, the instruction processing module 503 may include subunits that perform other functions described herein. For example, an instruction processing subunit may be programmed for acquiring a transmitting time of the user instruction for switching channel, along with acquiring the user instruction for switching channel. A determining subunit may be programmed for determining if the current time has reached the scheduled transmitting time. Another instruction processing subunit may be programmed for transmitting the user instruction for switching channel to the set-top box if the determining unit has determined that the current time has reached the scheduled transmitting time.

Alternatively, an instruction processing subunit may be programmed for acquiring an execution time of the user instruction for switching channel, along with acquiring the user instruction for switching channel. Another instruction processing subunit may be programmed for transmitting the user instruction for switching channel along with the execution time to the set-top box, such that the set-top box may determine if the current time has reached the scheduled execution time, and execute the instruction if affirmative.

Furthermore, in an embodiment, the mobile terminal 500 may include one or more processors 504, computer-readable memory and storage medium 505, a network interface 506, and I/O devices 507. The computer-readable memory and storage medium 505 is an example of computer-readable media as described in the foregoing description.

In an embodiment, the computer-readable memory and storage medium 505 may include program modules 508 and program data 509. In an embodiment, the program modules 508 may include the acquiring module 501, the display module 502 and/or the instruction processing module 503.

Figure 6:
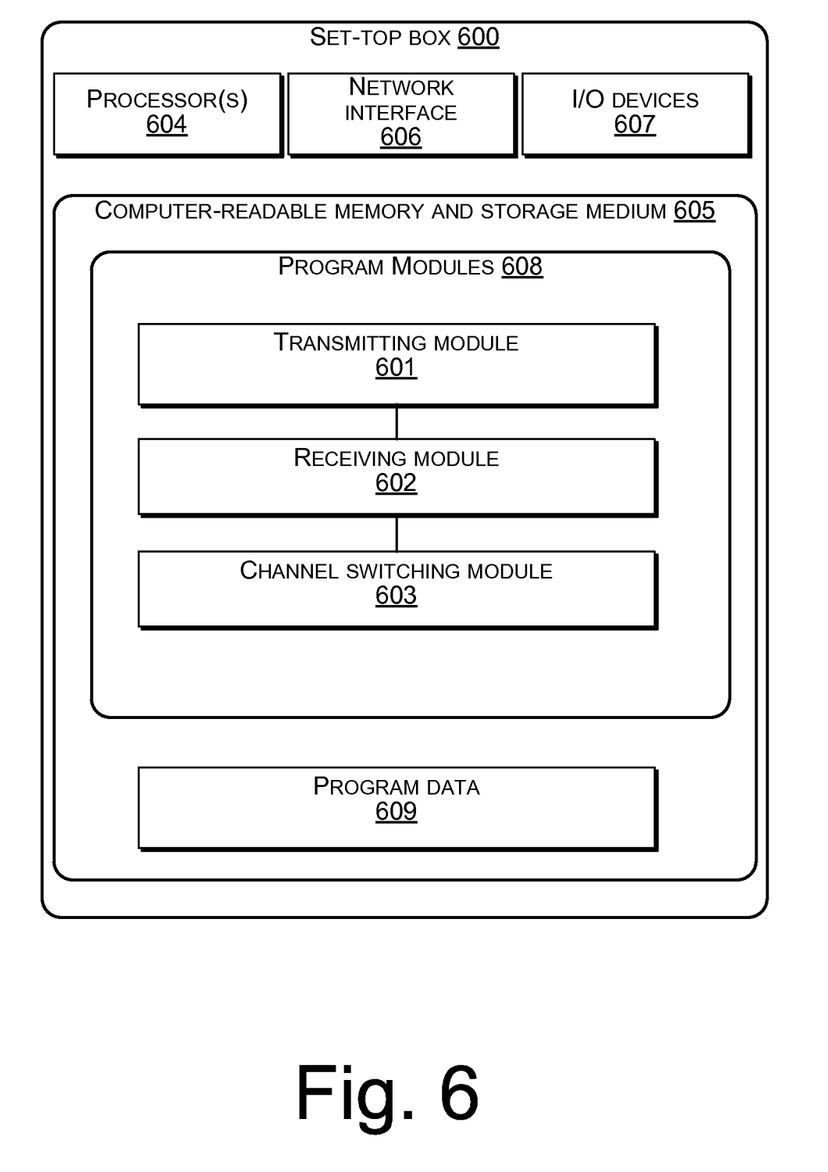
FIG. 6 is a block diagram of an example set-top box for implementing the disclosed method for switching TV channels.

FIG. 6 is a block diagram of an example set-top box for implementing the disclosed method for switching TV channels. The set-top box 600 is programmed to have modules as described below.

A transmitting module 601 is programmed for sending channel information to the mobile terminal, to allow a mobile terminal to display the received channel information on a mobile terminal display interface.

A receiving module 602 is programmed for receiving a channel switching instruction sent from the mobile device.

A channel switching module 603 is programmed for switching from a current channel to the user-selected channel according to the channel switching instruction.

In an embodiment, the set-top box 600 may further have an instruction receiving unit for receiving from the mobile terminal an instruction for reading channel information, along with a registration code of the mobile terminal. The set-top box 600 may also have a verification unit for verifying the received registration code. The instruction receiving unit and the verification unit, along with the channel information unit for sending the requested channel information to the mobile terminal, may be part of the transmitting module 601, or separate.

Furthermore, in an embodiment, the set-top box 600 may include one or more processors 604, computer-readable memory and storage medium 605, a network interface 606, and I/O devices 607. The computer-readable memory and storage medium 605 is an example of computer-readable media as described in the foregoing description.

In an embodiment, the computer-readable memory and storage medium 605 may include program modules 608 and program data 609. In an embodiment, the program modules 508 may include the transmitting module 601, the receiving module 602 and/or the channel switching module 603.

Figure 7:
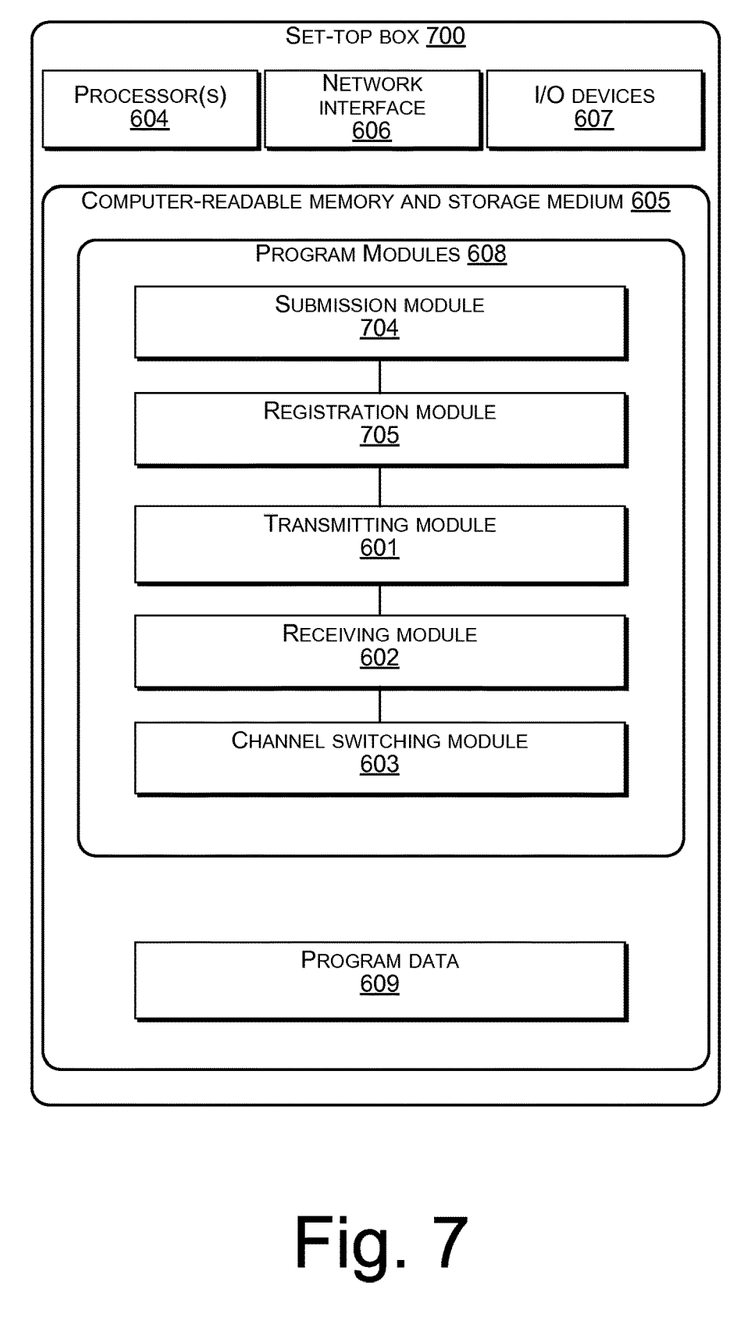
FIG. 7 is a block diagram of another example set-top box for implementing the disclosed method for switching TV channels.

FIG. 7 is a block diagram of another example set-top box for implementing the disclosed method for switching TV channels. In addition to the several modules and components (such as processors, memory, network interface, and I/O devices, etc.) in set-top box 600, the set-top box 700 further includes modules as described below.

A submission module 704 is programmed for receive the set-top box registration code of the mobile terminal submitted by the mobile terminal for registration.

A registration module 705 is programmed for registering the received registration code at the set-top box.

The disclosed methods and systems may be implemented by either hardware modules or software modules. The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

Various embodiments of the present specification are described progressively increased details with examples and environments. Each embodiment may focus a certain aspect of the disclosure, and therefore different embodiments may differ from one another, but may also share similar parts.

Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method comprising:
sending a registration code of a mobile terminal to a set-top box in a first data frame, the registration code of the mobile terminal enabling the set-top box to verify the mobile terminal before sending channel information to the mobile terminal;
receiving, at a mobile terminal, the channel information in a form of a second data frame from the set-top box according to a communication protocol, the second data frame including at least a protocol header, the registration code of the mobile terminal, a total number of channel information items included in the second data frame, information of each channel information item, and a protocol end;
displaying the channel information on a display screen of the mobile terminal;
receiving at the mobile terminal a user instruction for switching to a user desired channel, the user instruction including a transmitting time at which the user instruction is to be sent to the set-top box and the transmitting time being different from a current time; and
transmitting the user instruction in a third data frame from the mobile terminal to the set-top box at the transmitting time included in the user instruction, the user instruction further including an execution time to instruct the set-top box to switch to the user desired channel at the execution time different from the current time and the transmitting time, wherein switching to the user desired channel is performed when the user instruction Is executed at the set-top box at the execution time.

2. The method as recited in claim 1, wherein the registration code of the mobile terminal is sent along with a request for the channel information.

3. The method as recited in claim 2, wherein the sending the registration code of the mobile terminal to the set-top box is performed using a wireless communications device built-in the mobile terminal, the wireless communications device including one of a Bluetooth device, an infrared device, or Wi-Fi.

4. The method as recited in claim 1, further comprising:
obtaining an equipment identifier of the mobile terminal;
generating a set-top box registration code of the mobile terminal using the equipment identifier; and registering the set-top box registration code with the set-top box to enable the set-top box to verify the mobile terminal before sending the requested channel information.

5. A method comprising:
receiving, by a set-top box, a first data frame sent from a mobile terminal according to a communication protocol, the first data frame including at least a protocol header, a registration code of the mobile terminal, a reading instruction for reading the channel information and a protocol end;
sending channel information in a form of a second data frame from the set-top box to the mobile terminal according to the communication protocol to cause a presentation of the channel information on a display screen of the mobile terminal, the second data frame including at least the protocol header, the registration code of the mobile terminal, a total number of channel information items included in the second data frame, information of each channel information item, and the protocol end;
receiving, at the set-top box, a third data frame sent from the mobile terminal according to the communication protocol at a transmitting time, the third data frame including at least the protocol header, the registration code of the mobile terminal, a user instruction for switching to a user desired channel, and the protocol end, the user instruction comprising an execution time of the user instruction, the execution time being different from the transmitting time; and
switching to the user desired channel by executing the user instruction at the set-top box at the execution time.

6. The method as recited in claim 5, further comprises:
verifying, at the set-top box, the registration code of the mobile terminal before sending the channel information to the mobile terminal.

7. The method as recited in claim 6, wherein the registration code of the mobile terminal is received along with a request for the channel information.

8. The method as recited in claim 6, wherein the receiving the registration code of the mobile terminal is performed using a wireless communications device built-in the set-top box, the wireless communications device including one of a Bluetooth device, an infrared device, or Wi-Fi.

9. The method as recited in claim 5, further comprising:
registering, at the set-top box, the registration code to enable the set-top box; and
verifying, at the set-top box, the mobile terminal before sending the channel information to the mobile terminal.

10. A mobile device for switching television channels, wherein the mobile device comprises a processor, computer-readable memory and storage medium, and I/O devices, and is programmed to perform acts including:
sending a registration code of the mobile terminal to a set-top box in a first data frame, the registration code of the mobile terminal enabling the set-top box to verify the mobile terminal before sending channel information to the mobile terminal;
receiving channel information in a form of a second data frame from the set-top box according to a communication protocol, the second data frame including at least a protocol header, the registration code of the mobile terminal, a total number of channel information items included in the second data frame, information of each channel information item, and a protocol end;
displaying the channel information on a display screen;
receiving a user instruction for switching to a user desired channel, the user instruction including a transmitting time at which the user instruction is to be sent to the set-top box and the transmitting time being different from a current time; and
transmitting the user instruction in a third data frame to the set-top box at the transmitting time included in the user instruction, the user instruction further including an execution time to instruct the set-top box to switch to the user desired channel at the execution time different from the current time and the transmitting time, wherein switching to the user desired channel is performed when the user instruction Is executed at the set-top box at the execution time.

11. The mobile device as recited in claim 10, wherein the registration code of the mobile device is sent along with a request for the channel information.

12. The mobile device as recited in claim 10, wherein the sending the registration code of the mobile device to the set-top box is performed using a wireless communications device built-in the mobile device, the wireless communications device including one of a Bluetooth device, an infrared device, or Wi-Fi.

13. The mobile device as recited in claim 10, wherein mobile device is programmed to further perform:
obtaining an equipment identifier of the mobile device;
generating a set-top box registration code of the mobile device using the equipment identifier; and
registering the set-top box registration code with the set-top box to enable the set-top box to verify the mobile device before sending the requested channel information.

14. A set-top box for switching television channels, wherein the set-top box comprises a processor, computer-readable memory and storage medium, and I/O devices, and is programmed to perform acts including:
receiving a first data frame sent from a mobile terminal according to a communication protocol, the first data frame including at least a protocol header, a registration code of the mobile terminal, a reading instruction for reading the channel information and a protocol end;
sending channel information in a form of a second data frame from the set-top box to the mobile terminal according to the communication protocol to cause a presentation of the channel information on a display screen of the mobile terminal, the second data frame including at least the protocol header, the registration code of the mobile terminal, a total number of channel information items included in the second data frame, information of each channel information item, and the protocol end;
receiving a third data frame sent from the mobile terminal according to the communication protocol at a transmitting time, the third data frame including at least the protocol header, the registration code of the mobile terminal, a user instruction for switching to a user desired channel, and the protocol end, the user instruction comprising an execution time of the user instruction, the execution time being different from the transmitting time; and
switching to the user desired channel by executing the user instruction at the execution time.

15. The set-top box as recited in claim 14, wherein the set-top box is programmed to further perform:
registering the registration code of the mobile terminal; and verifying the registration code of the mobile terminal before sending the channel information.

16. The set-top box as recited in claim 14, wherein the registration code of the mobile terminal is received along with a request for the channel information.

17. The set-top box as recited in claim 14, wherein the receiving the registration code of the mobile terminal is performed using a wireless communications device built-in the set-top box, the wireless communications device including one of a Bluetooth device, an infrared device, or Wi-Fi.

18. The set-top box as recited in claim 14, wherein the set-top box is programmed to further perform:
   registering the registration code to enable the set-top box; and
   verifying the mobile terminal before sending the channel information to the mobile terminal.

\* \* \* \* \*